US012624314B2

(12) United States Patent
Ellis

(10) Patent No.: US 12,624,314 B2

(45) Date of Patent: May 12, 2026

(54) BIOBASED DISPERSANTS FOR LAUNDRY CLEANING APPLICATIONS

(71) Applicant: Borregaard AS, Sarpsborg (NO)

(72) Inventor: Ross Johannes Ellis, Sarpsborg (NO)

(73) Assignee: Borregaard AS, Sarpsborg (NO)

( * ) Notice: Subject to any disclaimer, the term of this patent is extended or adjusted under 35 U.S.C. 154(b) by 233 days.

(21) Appl. No.: 18/281,847

(22) PCT Filed: Mar. 14, 2022

(86) PCT No.: PCT/EP2022/056532

§ 371 (c)(1),
(2) Date: Sep. 13, 2023

(87) PCT Pub. No.: WO2022/194774

PCT Pub. Date: Sep. 22, 2022

(65) Prior Publication Data

US 2024/0191157 A1 Jun. 13, 2024

(30) Foreign Application Priority Data

Mar. 16, 2021 (EP) .................................... 21162927

(51) Int. Cl.
*C11D 3/34* (2006.01)
*C11D 3/00* (2006.01)
(Continued)

(52) U.S. Cl.
CPC ............ *C11D 3/228* (2013.01); *C11D 3/0036* (2013.01); *C11D 3/22* (2013.01); *C11D 3/222* (2013.01);
(Continued)

(58) Field of Classification Search
CPC ........... C11D 3/22; C11D 3/222; C11D 3/225; C11D 3/38; C11D 7/44; C11D 7/268
(Continued)

(56) References Cited

U.S. PATENT DOCUMENTS 4,752,509 A 6/1988 Simonson et al.
5,104,584 A 4/1992 Kong
(Continued)

FOREIGN PATENT DOCUMENTS

EP 1572849 B1 10/2013
JP S61-268729 A 11/1986
(Continued)

OTHER PUBLICATIONS

Fredheim, G.E. et al., Molecular weight determination of lignosulfonates by size-exclusion chromatography and multi-angle laser light scattering, J. Chromatogr. A., 942(1-2):191-199 (2002).
(Continued)

*Primary Examiner* — Gregory R Delcotto

(74) *Attorney, Agent, or Firm* — Choate, Hall & Stewart LLP; William R. Haulbrook; Michael D. Schmitt

(57) ABSTRACT

The present invention relates to the use of lignin derivatives, having a specific combination of degree of sulfonation and degree of oxidation, as an additive in a laundry detergent composition. Further, the present invention relates to a laundry detergent composition comprising the lignin derivative and to a laundry cleaning method.

20 Claims, 3 Drawing Sheets

(51) Int. Cl.

| | |
|---|---|
| ***C11D 3/22*** | (2006.01) |
| ***C11D 3/38*** | (2006.01) |
| ***C11D 7/26*** | (2006.01) |
| ***C11D 7/44*** | (2006.01) |

(52) U.S. Cl.
CPC ................ *C11D 3/225* (2013.01); *C11D 3/38* (2013.01); *C11D 7/268* (2013.01); *C11D 7/44* (2013.01)

(58) Field of Classification Search
USPC .......................................... 510/470, 471, 344
See application file for complete search history.

(56) References Cited

U.S. PATENT DOCUMENTS

| | | | |
|---|---|---|---|
| 5,230,814 | A | 7/1993 | Naae et al. |
| 6,100,385 | A | 8/2000 | Naae et al. |
| 6,207,808 | B1 | 3/2001 | Naae et al. |

FOREIGN PATENT DOCUMENTS

| | | | | | |
|---|---|---|---|---|---|
| JP | H02-500039 | A | | 1/1990 | |
| JP | 2005-513300 | A | | 5/2005 | |
| JP | 2006-509895 | A | | 3/2006 | |
| JP | 2012-503080 | A | | 2/2012 | |
| WO | WO-88/02417 | A1 | | 4/1988 | |
| WO | WO-03/056099 | A1 | | 7/2003 | |
| WO | WO-03/062254 | A1 | | 7/2003 | |
| WO | WO-2004/061067 | A2 | | 7/2004 | |
| WO | WO-2010/033743 | A1 | | 3/2010 | |
| WO | WO-2010/078930 | A2 | | 7/2010 | |
| WO | WO-2012/159778 | A1 | | 11/2012 | |
| WO | WO-2017037097 | A1 | * | 3/2017 | ......... C11D 3/38636 |
| WO | WO-2018124989 | A1 | * | 7/2018 | ............... C11D 1/37 |
| WO | WO-2021165298 | A1 | * | 8/2021 | ............. C11D 3/382 |

OTHER PUBLICATIONS

International Search Report for PCT/EP2022/056532, filed Mar. 14, 2022, 2 pages, (mailed Jul. 8, 2022).

Written Opinion for PCT/EP2022/056532, filed Mar. 14, 2022, 5 pages, (mailed Jul. 8, 2022).

* cited by examiner

| Sample | %S(org) | %COOH | Performance rating |
|---|---|---|---|
| A | 8 | 7,7 | Good |
| B | 9 | 6,1 | Good |
| C | 2 | 15,5 | Medium |
| D | 3,75 | 10,4 | Medium |
| E | 5,2 | 5,3 | Medium |
| F | 5,8 | 5,6 | Poor |
| G | 5,7 | 4,3 | Poor |
| H | 5,2 | 5,3 | Poor |
| | | | |

BIOBASED DISPERSANTS FOR LAUNDRY CLEANING APPLICATIONS

FIELD OF THE INVENTION

The present invention relates to the use of lignin derivatives, having a specific combination of degree of sulfonation and degree of oxidation, as an additive in a laundry detergent composition. Further, the present invention relates to a laundry detergent composition comprising the lignin derivative and to a laundry cleaning method.

BACKGROUND OF THE INVENTION

Laundry, in particular clothes, can become soiled with a variety of different soils, ranging from highly hydrophilic soils (e.g. clay) to highly hydrophobic soils (e.g. oil and grease). Laundry detergent compositions that are capable of removing a wide range of different soils, including hydrophilic and hydrophobic ones, are therefore generally sought after. To achieve that purpose, laundry detergent compositions comprising a complex mixture of ingredients such as surfactants, chelating agents, enzymes, and builders have been developed. Such laundry detergent compositions often further comprise dispersants for dispersing soils and preventing redeposition thereof onto the laundry.

Among others, ethoxylated polyalkylene imines and polycarboxylates have been used as dispersants. Such compounds, however, are generally petroleum-derived and prepared via laboratory chemical synthesis processes, which renders them quite costly and ecologically unfriendly.

Therefore, there is a generally high demand for bio-based and eco-friendly yet effective dispersants for use in laundry detergent compositions.

Lignin derivatives have been used as a component of laundry detergent compositions.

Lignin (also referred to as "native lignin") is one of the most abundant organic materials in nature and provides strength and support to trees and other plants. Lignin is a biopolymer, more precisely a mixture of biopolymers, that is/are present in the support tissues of plants, particularly in the cell walls providing rigidity to the plants. Lignin is a phenolic polymer, more precisely a mixture of phenolic polymers. The specific structure and composition of lignin depends on the plant and therefore varies depending on the plant from which it is derived. Lignin in its native form, i.e. as present in the plant, comprises an aromatic backbone structure and is generally hydrophobic and water-insoluble. Lignin is sometimes also referred to as the "glue" in the cellulosic skeleton.

WO 03/062254, for example, reports the use of lignin phenols and lignin phenol derivatives derived from Kraft lignin or from lignosulfonate via catalytic reduction as described in U.S. Pat. Nos. 6,207,808, 6,100,385, and 5,230,814 for use in household cleaning and laundry detergent compositions. However, the preparation of these lignin phenols and lignin phenol derivatives requires the use of rather harsh chemical synthesis, which increases their cost and their environmental impact.

Further, WO 2010/033743 reports the use of a modified lignin polymer in cleaning compositions. The lignin polymer comprises a randomly substituted lignin backbone wherein two or more of the hydroxyl groups on the randomly substituted lignin backbone have been substituted with R substituent groups, wherein each R substituent group is independently an R substituent type selected from the group consisting of nitrogen containing substituents $R^1$ with a substitution weight percentage ranging from 0% to 75%, anionic substituents $R^2$ with a substitution weight percentage ranging from 0% to 90%, alkoxy substituents $R^3$ with a substitution weight percentage ranging from 0% to 90%, and combinations of any thereof, provided that the randomly substituted lignin backbone comprises at least two different R substituent types. However, again, the preparation of these lignin derivatives requires the use of dedicated laboratory chemistry, which increases their cost and their environmental impact.

Thus, overall, bio-based, eco-friendly, and low-price yet effective dispersants for use as an additive in laundry detergent compositions are highly sought-after.

SUMMARY OF THE PRESENT INVENTION

Based on the above, it is an object of the present invention to provide bio-based, sustainably sourced, easy to produce, and highly effective dispersants for use as an additive in laundry detergent compositions. Further, it is desired that the dispersants can be prepared easily and cost-effectively in industrial-scale processes using naturally occurring materials, without the need for expensive chemicals/reactants. It is particularly desired to use compounds that are produced as by-products in industrial processes and therefore are available in large quantities.

These objects are achieved by the sulfonated lignin derivative of the present invention. The present invention is based on the surprising finding that lignin derivatives having a specific combination of degree of sulfonation and oxidation (as measured as the content of carboxylate groups in the lignin) are effective anti-redeposition aids for laundry cleaning purposes. However, not every sulfonated lignin derivative, in particular not every lignosulfonate, exhibits these anti-redeposition effect, which is indeed based on the specific combination of degree of sulfonation and carboxylate content.

In accordance with the present invention, the inventors have found that lignosulfonate derivates having a degree of sulfonation achieving at least 4.5% w/w, preferably from 4.5% w/w to 14% w/w, further preferably from 6% w/w to 10% w/w, organic sulfur (measured in the dry solid) and a carboxylate (COOH) content of at least 6% w/w, preferably from 6% w/w to 30% w/w, further preferably from 6% w/w to 20% w/w, (also measured in the dry solid) effectively reduce or prevent redeposition of soil onto fabric during a laundry cleaning process.

The amount of "organic" sulfur (% S (org), i.e. the amount of sulfur which is associated with the sulfonate groups attached to the lignin), i.e. the degree of sulfonation, is determined based on the difference between total sulfur % S (tot) and the inorganic sulfur % S (inorg) using the following relation: % S (org)=% S (tot)−% S (inorg). Total sulfur is determined with an element analyzer, for instance a ThermoQuest NCS 2500, Appropriate sample amounts (for instance 1-2 mg) are placed in tin capsules with a suitable catalyst (for instance Vanadium pentoxide). Total sulfur in the sample is then quantified using the 2,5-Bis(5-tert-butyl-2-benzo-oxazol-2-yl)thiophene (BBOT) standard, or other suitable sulfur standards. The samples are combusted at 1400° C. and all sulfur is oxidized to SO2 and quantified. Inorganic sulfur is determined by measuring sulfate in oxidized samples using ion chromatography with conductivity detection (for instance Dionex instrument using an IonPac AS11-HC column with 13 mM OH-eluent), 30 mg samples are weighed into 50-ml volumetric flasks. 10 ml of 0.5% NaOH and 5 ml of 3% H2O2 are added to oxidize sulfurous inorganic anions into sulfate. Samples are then left 12-16 h to give time to react. Milli-Q water is added and PH neutralized by adding 2 ml of 5% $CH3COOH$ and diluted to the mark with Milli-Q water. Sulfate standards are prepared between 5 mg/l and 80 mg/l. The sulfate content in the oxidized samples is then determined using ion chromatography according to the instrument manual.

The amount of "carboxylate", i.e. COOH groups is determined by potentiometric titration as described in subchapter 7.5.2 ("*Determination of carboxyl Groups by Nonaqueous Potentiometric Titration*") by C. W. Dence in the reference book "*Methods in Lignin Chemistry*", S. Y. Lin and C. W. Dence, Springer-Verlag Berlin Heidelberg, 1992, p 458-464. The amount is expressed as the weight % of carboxylate relative to the overall dry solids weight of the lignin derivative. Details about this standard reference book are provided in the preceding paragraph.

Without wishing to be bound by theory, it is believed that it is primarily or even predominantly the COOH-content (and not the COOR-content) that is responsible for characterizing the anti-redeposition performance of the lignosulfonate derivative. Hence, specifically the COOH-content is measured and claimed.

Further, it has surprisingly been found that no "laboratory chemistry" (synthesis) is necessary to obtain sulfonated lignin derivatives that show improved re-deposition protection in laundry detergents, but that such derivatives can be obtained directly from sulfite pulping. This finding allows for the provision of cost-effective, bio-based and environmentally friendly yet highly effective dispersants for use as an additive in a laundry detergent composition.

However, not every sulfonated lignin derivate, in particular not every lignosulfonate, has a degree of sulfonation and carboxylate content as defined herein and as necessary to obtain the advantageous anti-soiling and anti-redeposition properties. Suitable conditions are best described by the claimed combination of degree of sulfonation and carboxylate content in the lignin derivative. The skilled person generally understands how to adjust pulping process conditions to achieve these characteristic pulp parameters, for example as described in the standard textbook "*Pulping Processes*" by S. A. Rydholm, Interscience Publishers 1965, for example on pages 773-775. The skilled person can adjust pulping conditions and then determine sulfonate and carboxylate content as described above.

In a first aspect, the present invention relates to the use of a sulfonated lignin derivative as an additive in a laundry detergent composition. The lignin derivative is characterized in that it has an amount of "organic" sulfur (i.e. amount of sulfur which is associated with the sulfonate groups attached to the lignin), i.e. degree of sulfonation, of at least 4.5% w/w, preferably from 4.5% w/w to 14% w/w, further preferably from 6% w/w to 10% w/w organic sulfur, as measured in the dry solid relative to the overall dry solids weight of the lignin derivative and that it has a carboxylate (COOH) content of at least 6% w/w, preferably from 6% w/w to 30% w/w, further preferably from 6% w/w to 20%, w/w, as measured in the dry solid relative to the overall dry solids weight of the lignin derivative.

The degree of sulfonation (i.e. the "organic" sulfur content) and the carboxylate content (—COOH-group content) is as described above.

In a second aspect, the present invention relates to a laundry detergent composition comprising the sulfonated lignin derivative as defined herein.

In a third aspect, the present invention relates to a method for cleaning laundry, the method comprising the step of contacting laundry with the sulfonated lignin derivative described herein.

In a fourth aspect, the present invention relates the use of a lignin derivative as defined herein to lower the viscosity of detergent slurries during processing.

DETAILED DESCRIPTION OF THE INVENTION

Figure 1:
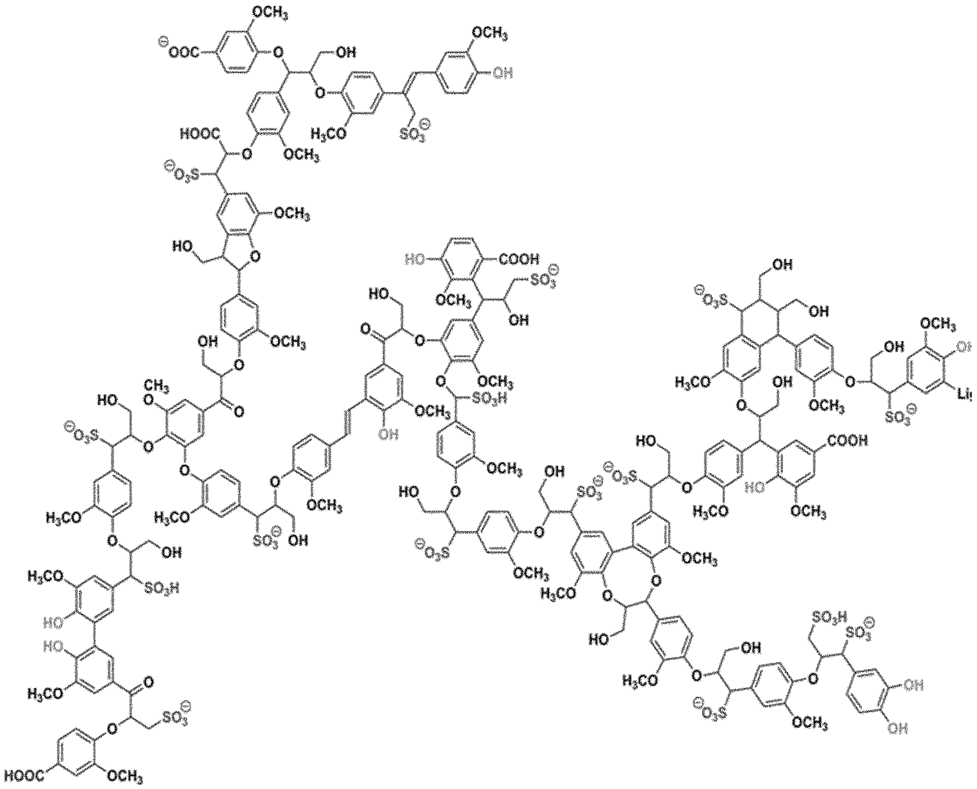
FIG. 1 illustrates an exemplary sulfonated lignin derivative (as obtained from sulfite pulping).

The present invention is at least partly based on the surprising finding that sulfonated lignin derivatives are particularly effective in reducing and/or preventing redeposition of soil onto fabric during a laundry cleaning process if they have a degree of sulfonation achieving at least 4.5% w/w, preferably from 4.5% w/w to 14% w/w, further preferably from 6% w/w to 10% w/w organic sulfur and a carboxylate content of at least 6% w/w, preferably from 6% w/w to 30% w/w, further preferably from 6% w/w to 20% w/w, wherein weight % is given relative to the overall dry solids weight of the lignin derivative.

The degree of sulfonation (i.e. the "organic" sulfur content) and the carboxylate content (—COOH-group content) is as described above.

In particular, it has been found that the advantageous properties of minimizing re-deposition of soil on laundry can be obtained with lignin derivatives as obtained as a by-product from industrial sulfite pulping or with lignin derivatives as obtained from Kraft pulping which have merely been subjected to a sulfonation reaction. Thus, in contrast to the prior art approach, it has been found that highly effective lignin-based dispersants can be obtained without the need to introduce specific functional groups via dedicated synthesis routes/laboratory chemistry. If necessary, one or more post-pulping sulfonation steps for fine-tuning the degree of sulfonation may be performed. However, such steps are not necessarily required.

Examples of post pulping methods to optimize the sulfonate/carboxylate content without introducing non-biobased carbon (i.e. carbon not originating from the lignin) into the lignin include sulfonation and various types of oxidation (e.g. thermal treatment, oxygen, peroxide, ozone, etc). However, in preferred embodiments, no post-pulping chemical modification of the lignosulfonate is performed.

In embodiments, lignosulfonate is used in combination with carboxymethyl cellulose (CMC) to increase the anti-redeposition properties. Without wishing to be bound by theory, it is believed that CMC work through adsorption onto the fabric surface to convey a negative surface charge, whilst the lignosulfonate adsorbs onto the surface of soil particles to convey a negative charge. This results in repulsive interactions between the soil and fabric to prevent redeposition.

In further embodiments, the lignosulfonate also aids in the release of soils from the fabric surface. Without wishing to be bound by theory, this release functionality is believed to be due to the amphiphilic properties of the lignosulfonate polymer, where the backbone is hydrophobic and the sulfonate groups hydrophilic. The amphiphilicity contributes to the surface activity of the detergent, which is believed to be largely responsible for the release of soils from the fabric surface.

In further embodiments, the lignosulfonate in the laundry detergent is (also) used as a processing aid. Lignosulfonates reduce the viscosity of slurries, which is useful in the spray drying of laundry detergent powders and in the pressing of tablets to reduce water and increase density.

As referred to herein, a "sulfonated lignin derivative" is a lignin derivative that is obtained from native lignin by introducing sulfonate groups. Sulfonate groups, as defined herein, are functional groups of the structure —$SO3^-$, wherein the sulfur atom is bound to a carbon atom of the lignin backbone. —$SO_3H$ groups are also covered by the term "sulfonate groups", as used herein.

An exemplary sulfonated lignin derivative (as obtained from sulfite pulping) is shown in FIG. 1. While the sulfonate groups can generally be introduced in different ways, it is preferred that the sulfonate groups are introduced by means of sulfite pulping.

"Sulfite pulping" is known in the art of wood/plant material processing. Sulfite pulping may be used for producing almost pure cellulose fibers from lignocellulosic biomass (i.e. plant matter). This "pulping" is typically achieved by extracting lignin from lignocellulosic biomass in large pressure vessels called digesters by using various salts of sulfurous acid. During sulfite pulping, lignin molecules are sulfonated and thereby rendered water-soluble. In accordance with the present invention, "sulfite pulping" refers to the process of reacting lignocellulosic biomass or derivatives thereof with at least one salt of sulfurous acid. The salts used in said pulping process are preferably sulfites ($SO_3^{2-}$) or bisulfites ($HSO_3^-$). Depending on the pulping conditions, feed material, and potential post processing, the lignosulfonate polymer can have varying structures and chemical functionalities, such as molecular weight, degree of sulfonation, degree of conjugation, carboxylate groups (—COOH), phenolic groups, etc.

Lignosulfonate therefore represents a highly diversified class of materials. An exemplary depiction of a lignosulfonate molecule as obtained from sulfite pulping is shown in FIG. 1.

The degree of sulfonation and carboxylate content of the lignosulfonate produced from sulfite pulping may be suitably adjusted by varying the pulping conditions, with higher sulfite salt content and a higher temperature generally yielding a higher degree of sulfonation and harsher conditions (e.g. high temperature) generally yielding a more oxidized lignin structure characterized by a higher carboxylate content.

"Kraft pulping" (also referred to as "sulfate pulping") is another process for wood/plant material processing. The Kraft process entails treatment of wood chips with a hot mixture of water, sodium hydroxide, and sodium sulfide, known as white liquor, that breaks the bonds that link lignin, hemicellulose, and cellulose. Kraft lignin can be described as precipitated, non-sulfonated alkaline lignin. Kraft lignin differs structurally and chemically from lignosulfonate, e.g. in that Kraft lignin is not water-soluble. Thus, if Kraft lignin is used in laundry detergent compositions, the Kraft lignin must first be rendered water-soluble, e.g. by sulfonation. Sulfite pulping or other sulfonating reactions may be used for sulfonating Kraft lignin.

The term "lignosulfonate", as used within the context of the present application, refers to any lignin derivative which is formed during sulfite pulping of lignin-containing material, such as, e.g., wood, in the presence of sulfite ions and/or bisulfite ions. For example, during the acidic sulfite pulping of lignin-based material, electrophilic carbon cations in the lignin are produced which are a result of the acid catalyzed ether cleavage. Thus, lignin may react, via these carbocations, with the sulfite or bisulfite ions under the formation of lignosulfonates.

As used herein, "Kraft lignin" refers to the lignin product as obtained from a Kraft pulping process. Kraft lignin does not comprise sulfonate groups. Thus, if Kraft lignin is to be used in the present invention, the Kraft lignin is first rendered water-soluble by sulfonation. Hence, in one embodiment of the invention, the lignin derivative is sulfonated lignin obtained from Kraft lignin (also referred to as "sulfonated Kraft lignin"). In embodiments, such sulfonated Kraft lignin may be obtained when Kraft lignin is treated with alkali sulfite and alkylaldehyde at elevated temperature and pressure. In other embodiments, sulfite pulping may be used for sulfonating Kraft lignin.

According to another embodiment, either the lignin derivative as obtained from sulfite pulping/cooking as described herein and above, or the lignin derivative as obtained from the sulfonated Kraft lignin as described herein and above is subjected to one further chemical treatment step, wherein said further step is selected from at least one oxidation step and/or thermal treatment step and/or sulfonation step.

Without wishing to be bound by theory, it is believed that the oxidation step alters the character of the lignin primarily by increasing the number of —COOH groups beyond what is already achieved in the sulfite pulping/cooking step. As shown in the experiments below, increasing the —COOH content generally improves anti-redeposition performance.

In preferred embodiments, said oxidation step is selected from at least one of the following: oxidation with air (oxygen) and/or a periodate, peroxide, ozone or the like, optionally at elevated temperature, TEMPO oxidation, optionally in the presence of an oxidation catalyst and other methods and agents known to the skilled person for oxidizing biomass.

Examples of such methods are described in *The Chemistry of Lignin. Supplement Volume, Covering the Literature for the Years* 1949-1958 by Dorothy Alexandra Brauns and Friedrich Emil Brauns (Academic Press; First Edition, Jan. 1, 1960, pg 498-548). The sulfonation step alters the character of the lignin primarily by increasing the number of sulfonate groups beyond what is already achieved in the sulfite pulping/cooking step. As shown in the experiments below, increasing the degree of sulfonation generally improves anti-redeposition performance.

In a preferred embodiment, said sulfonation step is selected from at least one of the following: additional sulfite cooking with any of the above sulfite salts, sulfomethylation reactions, and other methods and agents known to the skilled person for sulfonating biomass.

Examples of such methods are disclosed in *The Chemistry of Lignin. Supplement Volume, Covering the Literature for*

*the Years* 1949-1958 by Dorothy Alexandra Brauns and Friedrich Emil Brauns (Academic Press; First Edition, Jan. 1, 1960, pg 313-386).

In a first aspect, the present invention relates to the use of a sulfonated lignin derivative as an additive in a laundry detergent composition. The lignin derivative is characterized in that it has a degree of sulfonation achieving at least 4.5% w/w, preferably from 4.5% w/w to 14% w/w, further preferably from 6% w/w to 10% w/w organic sulfur and a carboxylate content of at least 6% w/w, preferably from 6% w/w to 30% w/w, further preferably from 6% w/w to 20% w/w, wherein the % w/w refers to the weight % relative to the overall dry solids weight of the lignin derivative. The degree of sulfonation (i.e. the "organic" sulfur content) and the carboxylate content (—COOH-group content) is as described above.

It has been found that such lignin derivatives are highly effective in reducing and/or preventing redeposition of soil onto fabric during a laundry cleaning process. In particular, it has been found that the reduction and/or prevention of soil onto fabric is considerably worse if the degree of sulfonation is below 4.5% w/w organic sulfur even if the carboxylate content is greater than 6%. Likewise, it has been found that the reduction and/or prevention of soil onto fabric is considerably worse if the carboxylate content is below 6%, even if the degree of sulfonation is above 4.5% organic sulfur.

Preferably, the sulfonated lignin derivative is obtained by treating native lignin in a sulfite pulping process. The sulfite pulping process may be followed by one or more post-pulping sulfonation steps to further increase the degree of sulfonation. However, in preferred embodiments no post-pulping steps other than sulfonation steps are applied.

According to another preferred embodiment, the sulfonated lignin derivative is obtained by treating native lignin in a Kraft pulping process to thereby obtain Kraft lignin and treating said Kraft lignin in one or more post-pulping sulfonation steps. Sulfite pulping may be used for sulfonating Kraft lignin. However, in preferred embodiments, no post-pulping steps other than sulfonation steps are applied.

In other words, the sulfonated lignin derivative is preferably lignosulfonate, which has optionally been further subjected to one or more post-pulping sulfonation steps, or the sulfonated lignin derivative is sulfonated Kraft lignin (i.e. Kraft lignin that has further been subjected to one or more sulfonation steps). Accordingly, the sulfonated lignin derivative does preferably not contain functional groups other than those obtained from sulfite pulping, Kraft pulping or from the one or more post-pulping sulfonation steps.

Preferably, the lignin derivative is lignosulfonate as obtained from sulfite pulping, which has optionally been further subjected to one or more post-pulping sulfonation steps. Further preferably, the lignin derivative is lignosulfonate as obtained from sulfite pulping, which has not been subjected to any post-pulping functionalization step.

According to another preferred embodiment, the lignin derivative is sulfonated Kraft lignin.

As referred to herein, a "post-pulping functionalization step", a "post-pulping step" or the like is a chemical or physical treatment step that is applied subsequent to sulfite pulping or Kraft pulping and that alters the molecular structure of the lignin derivative subjected to said "post-pulping functionalization step". However, any step applied after sulfite pulping or Kraft pulping that does not alter the chemical structure of the lignin derivative, for example, a step for increasing the purity of the lignin product (e.g. a washing step, a filtration step, and the like) is not a "post-pulping functionalization step", "post-pulping step" or the like within the meaning of the present application.

As referred to herein, "lignosulfonate as obtained from sulfite pulping" is lignosulfonate that is the direct product of sulfite pulping. Or, in other words, "lignosulfonate as obtained from sulfite pulping" is lignosulfonate directly obtained from a sulfite pulping process without the application of any post-pulping functionalization steps. Thus, lignosulfonate obtained as a by-product of cellulose production by means of sulfite pulping is a "lignosulfonate as obtained from sulfite pulping" within the meaning of the present invention.

It has been found that the structure (in particular the molecular weight and the amount of —COOH groups) of lignosulfonate as obtained from sulfite pulping can be further fine-tuned, in preferred embodiments, by modifying the sulfite pulping conditions.

In embodiments, a sulfite pretreatment step can be applied.

In a preferred embodiment, cellulosic biomass is used as a substrate in the present process, in particular lignocellulosic biomass, which does not require mechanical (pre) treatment, and wherein sulfite (pre) treatment ("cooking") is applied as the only (pre) treatment.

Sulfite cooking may generally be divided into four main groups: acid, acid bisulfite, weak alkaline, and alkaline sulfite pulping.

In a preferred embodiment of the present invention, cellulosic biomass is cooked with a sulfite, preferably a sodium, calcium, ammonium or magnesium sulfite under acidic, neutral, or basic conditions. This sulfite cooking dissolves most of the native lignin present in the cellulosic biomass as sulfonated lignin (lignosulfonate; water-soluble lignin), together with parts of the hemicellulose.

Sulfite pretreatment is preferably performed according to one of the following embodiments. Therein and throughout the present disclosure, the "sulfite pretreatment" is also referred to as "cook":

- acidic cook (preferably $SO_2$ with a hydroxide, further preferably with $Ca(OH)_2$, NaOH, $NH_4OH$ or $Mg(OH)_2$),
- bisulfite cook (preferably $SO_2$ with a hydroxide, further preferably with NaOH, $NH_4OH$ or $Mg(OH)_2$),
- weak alkaline cook (preferably $Na_2SO_3$, further preferably with $Na_2CO_3$), and
- alkaline cook (preferably $Na_2SO_3$ with a hydroxide, further preferably with NaOH).

With regard to the sulfite cooking, the respective disclosure of WO 2010/078930 with the title "*Lignocellulosic Biomass Conversion*" as filed on Dec. 16, 2009, is incorporated by reference into the present disclosure.

It is particularly preferred that the lignin derivative contains neither non-native nitrogen-containing substituents (also referred to herein as substituent $R^1$) nor non-native alkoxy substituents (also referred to herein as substituent $R^3$). Such substituents are comprised in lignin derivatives that are currently used in the art but are preferably not comprised in the lignin derivative of the present invention. Such substituents must be introduced by dedicated laboratory chemistry, which, however, shall be avoided by means of the present invention.

Non-native substituents, as used herein, are substituents (in the meaning of functional groups) that are not present in native lignin and that have been introduced by means of chemical synthesis.

The non-native nitrogen-containing substituents $R^1$ (which are preferably not contained in the lignin derivative of the present invention) include substituents having at least one quaternary ammonium cation or at least one amine nitrogen (i.e., primary, secondary, and tertiary amine) which may be protonated under mildly acidic conditions to form an ammonium cation. In particular, the non-native nitrogen-containing substituent $R^1$ has the following structure:

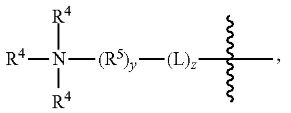

where each $R^4$ is independently selected from the group consisting of a lone pair of electrons, H, $CH_3$, and linear or branched, saturated or unsaturated $C_2$-$C_{18}$ alkyl, provided that at least two of the $R^4$ groups are not a lone pair of electrons; $R^5$ is a linear or branched, saturated or unsaturated $C_2$-$C_{18}$ alkyl chain or a linear or branched, saturated or unsaturated secondary hydroxy ($C_2$-$C_{18}$)alkyl chain; L is a linking group selected from the group consisting of —O—, —C(O)O—, —$NR^6$—, —C(O)$NR^6$—, and —$NR^6$C(O)$NR^6$—, where $R^6$ is H or $C_1$-$C_6$ alkyl; y has a value of 0 or 1; and z has a value of 0 or 1.

The non-native alkoxy substituent $R^3$ (which preferably is also not contained in the lignin derivative of the present invention) particularly has the following structure:

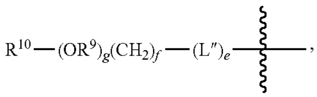

wherein e has a value of 0 or 1; f is an integer from 0 to 8; g is an integer from 0 to 50; L" is a linking group selected from the group consisting of —O—, —C(O)O—, —$NR^{11}$, —C(O)$NR^{11}$—, and —$NR^{11}$C(O)$NR^{11}$—, where $R^{11}$ is H or $C_1$-$C_6$ alkyl; each $R^9$ is the group ethylene, propylene, butylene, or mixtures thereof, and $R^{10}$ is an end group selected from the group consisting of hydrogen, $C_1$-$C_{20}$ alkyl, hydroxy, —$OR^1$, and —$OR^2$,
wherein $R^2$ is an anionic substituent, which preferably has the following structure:

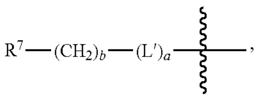

wherein $R^7$ is an anionic group selected from the group consisting of carboxylate, carboxymethyl, succinate, sulfate, sulfonate, arylsulfonate, phosphate, phosphonate, dicarboxylate, and polycarboxylate; L' is a linking group selected from the group consisting of —O—, —CO(O)—, —$NR^8$—, —C(O)$NR^8$—, and —$NR^8$(CO)$NR^8$—, where $R^8$ is H or $C_1$-$C_6$ alkyl; a has a value of 0 or 1; and b is an integer from 0 to 18.

According to a particularly preferred embodiment, the lignin derivative is not a modified lignin polymer comprising:

a randomly substituted lignin backbone comprising substituted lignin monomer residues and unsubstituted lignin monomer residues, wherein at least two or more of the hydroxyl groups on the randomly substituted lignin backbone have been substituted with R substituent groups, wherein each R substituent group is independently an R substituent type selected from the group consisting of nitrogen containing substituents $R^1$ with a substitution weight percentage ranging from 0% to 75%, anionic substituents $R^2$ with a substitution weight percentage ranging from 0% to 90%, alkoxy substituents $R^3$ with a substitution weight percentage ranging from 0% to 90%, and combinations of any thereof, provided that the randomly substituted lignin backbone comprises at least two different R substituent types.

Preferably, in that preferred embodiment, nitrogen-containing substituent $R^1$, anionic substituent $R^2$, and alkoxy substituent $R^3$ are defined as set out above.

Preferably, the lignin derivative does not comprise non-native hydrophobic substituents. Such non-native hydrophobic substituents are preferably selected from linear or branched, saturated or unsaturated $C_1$-$C_{18}$ alkyl; linear or branched, saturated or unsaturated $C_7$-$C_{18}$ alkylaryl; linear or branched, saturated or unsaturated secondary hydroxy ($C_2$-$C_{18}$)alkyl; hydrophobic polymer graft; and linear or branched, saturated or unsaturated $C_1$-$C_{18}$ alkyl ether.

As is evident from the above, the lignin derivative is preferably used for preventing or reducing the redeposition of soil onto fabric during a laundry washing process.

The molecular weight (weight average, MW) of the lignin derivative is preferably less than 100,000 Da, or 2,000 Da to 100,000 Da, preferably 5,000 to 100,000, even more preferably 10,000 to 100,000. The molecular weight is determined by means of size exclusion chromatography as described in G. Fredheim et al., "Molecular weight determination of lignosulfonates by size-exclusion chromatography and multi-angle laser light scattering", *J Chromatogr A.*, 942, 2002, 191-199.

In a second aspect, the present invention relates to a laundry detergent composition comprising the lignin derivative as defined herein.

The laundry detergent composition may be in any suitable form, for example in the form of a tablet, a powder, a granule, a paste, a liquid or a gel.

Preferably, the lignin derivative is comprised in the laundry detergent composition in an amount of 0.01-10% w/w, preferably 0.1-5% w/w, even more preferably 1-5% w/w based on the total weight of the detergent formulation.

In a third aspect, the present invention relates to a method for cleaning laundry, the method comprising the step of contacting laundry with the sulfonated lignin derivative as defined herein.

In a fourth aspect, the present invention relates the use of a lignin derivative as defined herein to lower the viscosity of detergent slurries during processing.

Preferably, the step of contacting laundry with the sulfonated lignin derivative is a step of contacting said laundry with an aqueous solution comprising the sulfonated lignin derivative. In a fourth aspect, the present invention relates the use of a lignin derivative as defined herein to lower the viscosity of detergent slurries during processing.

Lignosulfonates are well known to lower the viscosity of mineral salt slurries and pastes. This allows for a more efficient processing of powders, granules and tablets. In one embodiment of the invention, the lignin derivative as defined herein is used to reduce the viscosity of a detergent slurry composition during processing. This gives a more efficient manufacturing as less water is needed to be removed during drying, it gives improved spray dried detergent powders and it gives denser detergent tablets, etc. The lignin derivative is present in an amount of 0.001-15% w/w, preferably 0.1-10% w/w, more preferably 0.2-5% w/w based on the total weight of the detergent slurry composition.

The present invention is also described by the following items/embodiments, also in combination with each other and in combination with features or embodiments described throughout the present disclosure.

Item 1. Use of a sulfonated lignin derivative as an additive in a laundry detergent composition, characterized in that the sulfonated lignin derivative has an amount of organic sulfur which is associated with the sulfonate groups attached to the lignin, of at least 4.5% w/w, preferably from 4.5% w/w to 14% w/w, further preferably from 6% w/w to 10% w/w, as measured in the dry solid relative to the overall dry solids weight of the lignin derivative, and a carboxylate content of at least 6% w/w, preferably from 6% w/w to 30% w/w, further preferably from 6% w/w to 20% w/w, as measured in the dry solid relative to the overall dry solids weight of the lignin derivative wherein the amount of organic sulfur and the carboxylate content are determined as described in the description.

Item 2. The use of item 1, wherein the lignin derivative is obtained by treating native lignin in a sulfite pulping process, wherein said sulfite pulping process is optionally followed by one or more post-pulping sulfonation steps, or wherein the lignin derivative is obtained by treating native lignin in a Kraft pulping process followed by one or more post-pulping sulfonation steps.

Item 3. The use of item 2, wherein no post-pulping steps apart from the one or more post-pulping sulfonation steps are applied.

Item 4. The use according to any one of the preceding items, wherein the lignin derivative is lignosulfonate, which has optionally been further subjected to one or more post-pulping sulfonation steps, or wherein the lignin derivative is sulfonated Kraft lignin.

Item 5. The use according to any one of the preceding items, wherein the lignin derivative has not been subjected to any functionalization step other than sulfite pulping, Kraft pulping, or the one or more post-pulping sulfonation steps.

Item 6. The use according to any one of the preceding items, wherein the lignin derivative does not contain functional groups other than those obtained from sulfite pulping, Kraft pulping or one or more post-pulping sulfonation steps, preferably wherein said sulfonation step or sulfonation steps are selected from at least the following: additional sulfite cooking with at least one sulfite salts or sulfomethylation reactions Item 7. The use according to any one of the preceding items, wherein the lignin derivative is lignosulfonate as obtained from sulfite pulping.

Item 8. The use according to any one of items 1 to 6, wherein the lignin derivative is sulfonated Kraft lignin.

Item 9. The use according to any one of the preceding items, wherein the lignosulfonate is used in combination with carboxymethyl cellulose (CMC).

Item 11. The use according to any one of items 1-4 or item 7 or item 8, wherein the lignosulfonate is subjected to one further chemical treatment step, wherein said chemical treatment step is an oxidation step, preferably wherein said oxidation step is selected from at least one of the following: oxidation with air (oxygen) and/or a periodate, peroxide, ozone or the like, optionally at elevated temperature, TEMPO oxidation, optionally in the presence of an oxidation catalyst.

Item 13. The use according to any one of the preceding items, wherein the average molecular weight of the lignin derivative, as measured as specified in the description, is less than 100,000 Da, preferably from 2,000 Da to 100,000 Da, preferably from 5,000 to 100,000, even more preferably from 10,000.

Item 14. The use according to any one of the preceding items, wherein the lignin derivative does neither contain a non-native nitrogen-containing substituent $R^1$ nor a non-native alkoxy substituent $R^3$.

Item 15. The use according to item 14, wherein the non-native nitrogen-containing substituent $R^1$ has the following structure:

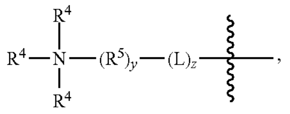

where each $R^4$ is independently selected from the group consisting of a lone pair of electrons, H, $CH_3$, and linear or branched, saturated or unsaturated $C_2$-$C_{18}$ alkyl, provided that at least two of the $R^4$ groups are not a lone pair of electrons; $R^5$ is a linear or branched, saturated or unsaturated $C_2$-$C_{18}$ alkyl chain or a linear or branched, saturated or unsaturated secondary hydroxy ($C_2$-$C_{18}$)alkyl chain; L is a linking group selected from the group consisting of —O—, —C(O)O—, —$NR^8$—, —C(O)$NR^6$—, and —$NR^6$C(O)$NR^6$—, where $R^6$ is H or $C_1$-$C_6$ alkyl; y has a value of 0 or 1; and z has a value of 0 or 1.

Item 16. The use according to item 14 or item 15, wherein the non-native alkoxy substituent $R^3$ has the following structure:

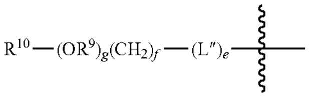

wherein e has a value of 0 or 1; f is an integer from 0 to 8; g is an integer from 0 to 50; L" is a linking group selected from the group consisting of —O—, —C(O)O—, —$NR^{11}$, —C(O)$NR^{11}$, and —$NR^{11}$C(O)$NR^{11}$—, where $R^{11}$ is H or $C_1$-$C_6$ alkyl; each $R^9$ is the group ethylene, propylene, butylene, or mixtures thereof, and $R^{10}$ is an end group selected from the group consisting of hydrogen, $C_1$-$C_{20}$ alkyl, hydroxy, —$OR^1$ and —$OR^2$, wherein $R^1$ is as defined in claims 10 or 11 and $R^2$ is an anionic substituent, wherein $R^2$ is preferably an anionic substituent having the following structure:

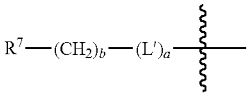

wherein $R^7$ is an anionic group selected from the group consisting of carboxylate, carboxymethyl, succinate, sulfate, sulfonate, arylsulfonate, phosphate, phosphonate, dicarboxylate, and polycarboxylate; L' is a linking group selected from the group consisting of —O—, —CO(O)—, —$NR^8$—, —C(O)$NR^8$—, and $NR^8$(CO)$NR^8$—, where $R^8$ is H or $C_1$-$C_6$ alkyl; a has a value of 0 or 1; and b is an integer from 0 to 18.

Item 17. The use according to any one of the preceding items, wherein the lignin derivative is not a modified lignin polymer comprising:

a randomly substituted lignin backbone comprising substituted lignin monomer residues and unsubstituted lignin monomer residues, wherein at least two or more of the hydroxyl groups on the randomly substituted lignin backbone have been substituted with R substituent groups, wherein each R substituent group is independently an R substituent type selected from the group consisting of nitrogen containing substituents $R^1$ with a substitution weight percentage ranging from 0% to 75%, anionic substituents $R^2$ with a substitution weight percentage ranging from 0% to 90%, alkoxy substituents $R^3$ with a substitution weight percentage ranging from 0% to 90%, and combinations of any thereof, provided that the randomly substituted lignin backbone comprises at least two different R substituent types.

Item 18. The use according to item 17, wherein each nitrogen-containing substituent $R^1$ independently has the following structure:

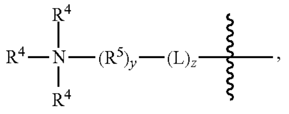

where each $R^4$ is independently selected from the group consisting of a lone pair of electrons, H, $CH_3$, and linear or branched, saturated or unsaturated $C_2$-$C_{18}$ alkyl, provided that at least two of the $R^4$ groups are not a lone pair of electrons; $R^5$ is a linear or branched, saturated or unsaturated $C_2$-$C_{18}$ alkyl chain or a linear or branched, saturated or unsaturated secondary hydroxy ($C_2$-$C_{18}$)alkyl chain; L is a linking group selected from the group consisting of —O—, —C(O)O—, —$NR^8$—, —C(O)$NR^6$—, and —$NR^6$C(O)$NR^6$—, where Re is H or $C_1$-$C_6$ alkyl; y has a value of 0 or 1; and z has a value of 0 or 1.

Item 19. The use according to item 17 or item 18, wherein each anionic substituent $R^2$ independently has the following structure

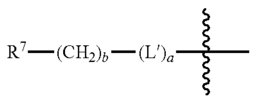

wherein $R^7$ is an anionic group selected from the group consisting of carboxylate, carboxymethyl, succinate, sulfate, sulfonate, arylsulfonate, phosphate, phosphonate, dicarboxylate, and polycarboxylate; L' is a linking group selected from the group consisting of —O—, —CO(O)—, —$NR^8$—, —C(O)$NR^8$—, and $NR^8$(CO)$NR^8$—, where $R^8$ is H or $C_1$-$C_6$ alkyl; a has a value of 0 or 1; and b is an integer from 0 to 18.

Item 20 The use according to any one of items 17-19, wherein each alkoxy substituent $R^3$ independently has the following structure:

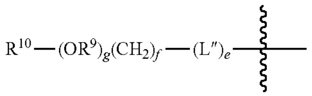

wherein e has a value of 0 or 1; f is an integer from 0 to 8; g is an integer from 0 to 50; L" is a linking group selected from the group consisting of —O—, —C(O)O—, —$NR^{11}$, —C(O)$NR^{11}$—, and —$NR^{11}$C(O)$NR^{11}$—, where $R^{11}$ is H or $C_1$-$C_6$ alkyl; each $R^9$ is the group ethylene, propylene, butylene, or mixtures thereof, and $R^{10}$ is an end group selected from the group consisting of hydrogen, $C_1$-$C_{20}$ alkyl, hydroxy, —$OR^1$ and —$OR^2$.

Item 22. The use according to any one of the preceding items, wherein the lignin derivative does not comprise non-native hydrophobic substituents.

Item 23. The use according to item 22, wherein the hydrophobic substituent has a structure selected from a linear or branched, saturated or unsaturated $C_1$-$C_{18}$ alkyl; a linear or branched, saturated or unsaturated $C_7$-$C_{18}$ alkylaryl; a linear or branched, saturated or unsaturated secondary hydroxy ($C_2$-$C_{18}$)alkyl; a hydrophobic polymer graft; and a linear or branched, saturated or unsaturated $C_1$-$C_{18}$ alkyl ether.

Item 24. The use according to any one of the preceding items, wherein the lignin derivative is used for preventing the redeposition of soil onto fabric during a laundry cleaning process.

Item 25. A laundry detergent composition comprising the lignin derivative as defined in any one of items 1-23.

Item 26. The laundry detergent composition according to item 25 wherein the lignin derivative is comprised in the laundry detergent composition in an amount of 0.01-10% w/w, preferably 0.1-5% w/w, even more preferably 1-5% w/w based on the total weight of the detergent formulation.

Item 27. A method for cleaning laundry, comprising the step of contacting laundry with the sulfonated lignin derivative as defined in in any one of items 1-23.

Item 28. The use of the lignin derivative as defined in any one of items 1-23 for reducing the viscosity of a detergent slurry composition, wherein the lignin derivative is present in an amount of 0.001-15% w/w, preferably 0.1-10% w/w, more preferably 0.2-5% w/w based on the total weight of the detergent slurry composition.

EXAMPLES

Example 1

Figure 2:
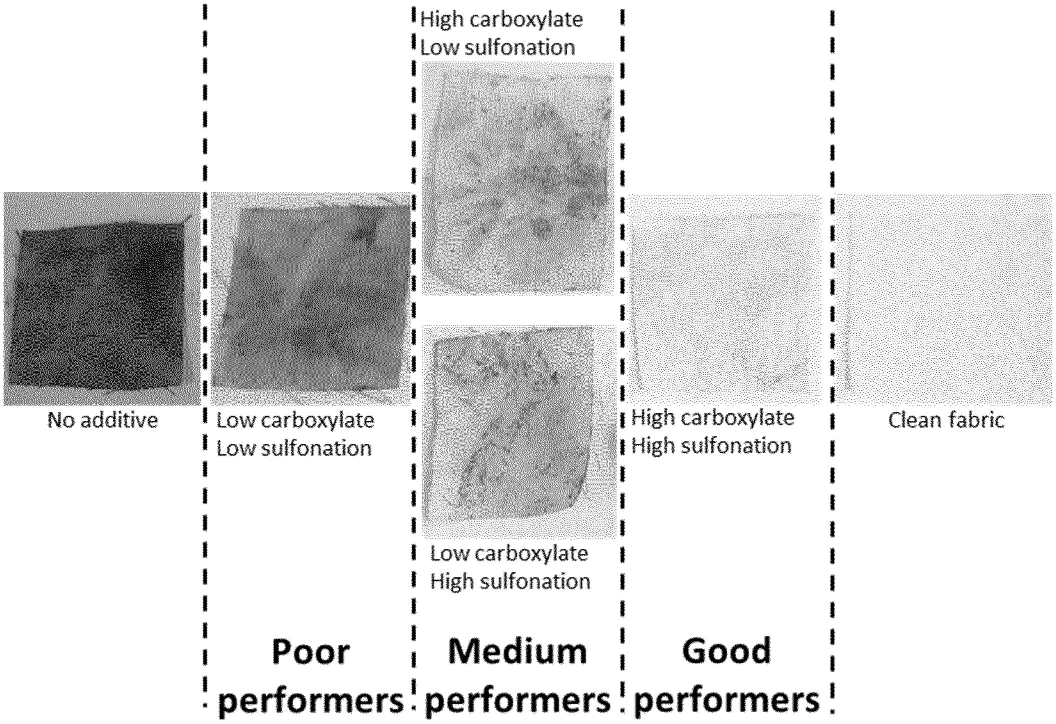
FIG. 2 illustrates results of a screening of sulfonated lignins with various degrees of sulfonation and carboxvlate content.
Figures 3, 4:
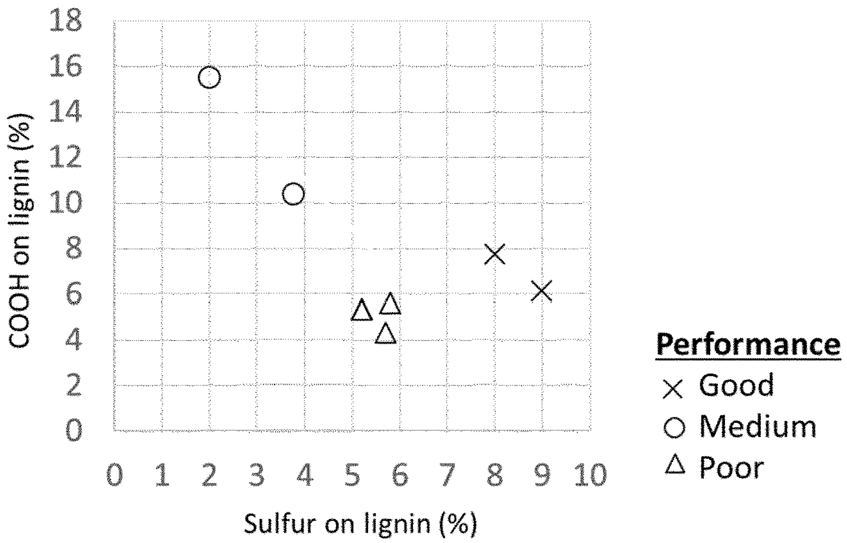
FIG. 3 illustrates a plot of performance results of the screening of sulfonated lignins with various degrees of sulfonation and carboxvlate content.
FIG. 4 illustrates a table of the performance results of the screening of sulfonated lignins with various degrees of sulfonation and carboxvlate content.

A variety of commercial sulfonated lignins were screened for their anti-redeposition properties in the following example. The sulfonated lignins as tested vary in degree of sulfonation and carboxylate content due to the different pulping conditions and post pulping treatments that are typically applied in the commercial production of lignosulfonates. The exact conditions that the lignosulfonates are produced under in the mill vary between manufacturers and product lines. For the purposes of these examples, the two lignosulfonates labelled A and B are in accordance with the invention, while lignosulfonates C through H do not have the required high degree of sulfonation and carboxylation and are thus reference examples (see FIGS. 2 and 3).

The degree of sulfonation (i.e. the "organic" sulfur content) and the carboxylate content (—COOH-group content) is as described above.

To test the activity of the different lignosulfonates in preventing the deposition of "soil" on fabric, the following test was used:

A "soil" was made by blending 1 g of carbon black into 200 ml of cooking oil using an Ultraturrax mixer.

to a 600 ml beaker: 300 ml of water was added, stirred rapidly with a magnetic stirrer, and 3 mL of the "soil" (above) was added.

The mixture was stirred until the soil was finely dispersed in the water a white 10 cm×10 cm square of cotton-polyester fabric was dropped into the beaker and stirred for 10 mins.

The stirring was stopped, the fabric fished out with tweezers, rinsed briefly by submerging into a beaker of fresh water.

The fabric was left to dry and then inspected.

Anti-redeposition performance was judged qualitatively by the amount of black soil spots on the fabric The results of the test (see FIGS. 2 and 3; samples A and B vs. samples C through H) demonstrate that the lignins with the claimed comparatively high degree of sulfonation and a comparatively high carboxylate content performed significantly better.

The invention claimed is:

1. An additive for a laundry detergent composition, the additive comprising a sulfonated lignin derivative characterized in that the sulfonated lignin derivative has an amount of organic sulfur which is associated with sulfonate groups attached to lignin of at least 4.5% w/w, as measured in dry solid relative to overall dry solids weight of the sulfonated lignin derivative, and a carboxylate content of at least 6% w/w, as measured in the dry solid, relative to the overall dry solids weight of the sulfonated lignin derivative.

2. The additive of claim 1, wherein the sulfonated lignin derivative has been obtained by treating native lignin in a sulfite pulping process or wherein the sulfonated lignin derivative has been obtained by treating native lignin in a Kraft pulping process followed by one or more post-pulping sulfonation steps.

3. The additive of claim 2, wherein the sulfonated lignin derivative has been obtained by treating native lignin in a Kraft pulping process followed by one or more post-pulping sulfonation steps and no post-pulping steps apart from the one or more post-pulping sulfonation steps have been applied.

4. The additive according to claim 1, wherein the sulfonated lignin derivative is lignosulfonate or wherein the sulfonated lignin derivative is sulfonated Kraft lignin.

5. The additive according to claim 1, wherein the sulfonated lignin derivative has not been subjected to any functionalization step other than sulfite pulping, Kraft pulping, or one or more post-pulping sulfonation steps.

6. The additive according to claim 1, wherein the sulfonated lignin derivative does not contain functional groups other than those obtained from sulfite pulping, Kraft pulping or one or more post-pulping sulfonation steps.

7. The additive according to claim 1, wherein the sulfonated lignin derivative is lignosulfonate as obtained from sulfite pulping.

8. The additive according to claim 1, wherein the sulfonated lignin derivative is sulfonated Kraft lignin.

9. The additive according to claim 1, wherein the sulfonated lignin derivative is lignosulfonate that is used in combination with carboxymethyl cellulose (CMC).

10. The additive according to claim 1, wherein an average molecular weight of the sulfonated lignin derivative is less than 100,000 Da.

11. The additive according to claim 1, wherein the sulfonated lignin derivative does not comprise non-native hydrophobic substituents.

12. A laundry detergent composition comprising the lignin derivative additive as defined in claim 1.

13. The laundry detergent composition according to claim 12, wherein the sulfonated lignin derivative is comprised in the laundry detergent composition in an amount of 0.01-10% w/w based on total weight of the laundry detergent composition.

14. A method for cleaning laundry, comprising the step of contacting laundry with the additive as defined in claim 1.

15. The method according to claim 14 comprising preventing redeposition of soil onto fabric during the cleaning.

16. A detergent slurry composition comprising the additive of claim 1, wherein the sulfonated lignin derivative is present in an amount of 0.001-15% w/w based on total weight of the detergent slurry composition and the detergent slurry composition has a reduced viscosity as compared to an otherwise equivalent detergent slurry composition without the additive.

17. The additive of claim 1, wherein the amount of organic sulfur is in a range from 4.5% w/w to 14% w/w as measured in the dry solid, relative to the overall dry solids weight of the sulfonated lignin derivative.

18. The additive of claim 1, wherein the amount of organic sulfur is in a range from 6% w/w to 10% w/w as measured in the dry solid, relative to the overall dry solids weight of the sulfonated lignin derivative.

19. The additive of claim 1, wherein the carboxylate content is in a range from 6% w/w to 30% w/w as measured in the dry solid, relative to the overall dry solids weight of the sulfonated lignin derivative.

20. The additive of claim 1, wherein the carboxylate content is in a range from 6% w/w to 20% w/w as measured in the dry solid, relative to the overall dry solids weight of the sulfonated lignin derivative.

* * * * *